United States Patent [19]

Hutchins et al.

[11] Patent Number: 5,762,141
[45] Date of Patent: Jun. 9, 1998

[54] ULTRA-HIGH TEMPERATURE STABLE GELS

[75] Inventors: Richard D. Hutchins, Placentia; Hoai T. Dovan, Yorba Linda; Burton B. Sandiford, Balboa Island, all of Calif.

[73] Assignee: Union Oil Company Of California, El Segundo, Calif.

[21] Appl. No.: 838,480

[22] Filed: Apr. 7, 1997

Related U.S. Application Data

[63] Continuation of Ser. No. 346,679, Nov. 30, 1994, which is a continuation-in-part of Ser. No. 119,715, Sep. 10, 1993, Pat. No. 5,486,312, which is a division of Ser. No. 940,301, Aug. 31, 1992, Pat. No. 5,246,073.

[51] Int. Cl.$^6$ ................................ E21B 33/138
[52] U.S. Cl. ................ 166/295; 166/300; 507/222; 507/225; 507/903; 523/130
[58] Field of Search ........................ 166/294, 295, 166/300, 305.1, 308; 507/222, 225, 903; 523/130

[56] References Cited

U.S. PATENT DOCUMENTS

| | | | |
|---|---|---|---|
| 3,511,789 | 5/1970 | Shannon et al. | 528/192 X |
| 3,661,868 | 5/1972 | Barron | 526/307 X |
| 3,929,695 | 12/1975 | Murata et al. | 528/129 X |
| 3,959,569 | 5/1976 | Burkholder, Jr. | 428/475 |
| 4,075,183 | 2/1978 | Kawakami et al. | 526/307 |
| 4,137,182 | 1/1979 | Golinkin . | |
| 4,246,124 | 1/1981 | Swanson . | |
| 4,300,634 | 11/1981 | Clampitt | 166/295 X |
| 4,389,320 | 6/1983 | Clampitt . | |
| 4,413,680 | 11/1983 | Sandiford et al. | 166/270 |
| 4,428,432 | 1/1984 | Pabley | 166/307 X |
| 4,440,228 | 4/1984 | Swanson . | |
| 4,514,309 | 4/1985 | Wadhwa . | |
| 4,534,412 | 8/1985 | Dovan et al. | 166/295 |
| 4,553,601 | 11/1985 | Almond et al. | 166/308 |
| 4,579,670 | 4/1986 | Payne . | |
| 4,606,772 | 8/1986 | Almond et al. | 525/329.4 X |
| 4,619,776 | 10/1986 | Mondshine . | |
| 4,654,132 | 3/1987 | Takagi et al. | 204/182.8 X |
| 4,776,398 | 10/1988 | Chu et al. . | |
| 4,779,680 | 10/1988 | Sydansk . | |
| 4,782,900 | 11/1988 | Fung et al. | 166/270 |
| 4,801,389 | 1/1989 | Brannon et al. . | |
| 4,811,787 | 3/1989 | Navratil et al. . | |
| 4,884,636 | 12/1989 | Mumallah et al. | 166/295 |
| 4,896,723 | 1/1990 | Hoskin et al. . | |
| 4,907,656 | 3/1990 | Sanchez et al. | 166/270 |
| 4,926,943 | 5/1990 | Hoskin | 166/270 |
| 4,928,766 | 5/1990 | Hoskin | 166/270 |
| 4,942,217 | 7/1990 | Gardziella et al. | 528/129 |
| 5,071,890 | 12/1991 | Shu et al. | 523/130 |
| 5,079,278 | 1/1992 | Mitchell | 523/130 |
| 5,125,456 | 6/1992 | Hutchins et al. | 166/295 |
| 5,145,012 | 9/1992 | Hutchins et al. | 166/292 |
| 5,145,913 | 9/1992 | Gerber | 528/129 X |
| 5,160,445 | 11/1992 | Sharif . | |
| 5,246,073 | 9/1993 | Sandiford et al. | 166/295 |
| 5,335,733 | 8/1994 | Sandiford et al. | 166/300 |
| 5,399,269 | 3/1995 | Moradi Araghi | 507/225 X |
| 5,480,933 | 1/1996 | Fox et al. | 166/295 X |
| 5,486,312 | 1/1996 | Sandiford et al. | 252/315.1 |
| 5,617,920 | 4/1997 | Dovan et al. | 166/295 |

FOREIGN PATENT DOCUMENTS

| | | |
|---|---|---|
| 0139471 | 5/1985 | European Pat. Off. . |
| 0446865 | 3/1991 | European Pat. Off. . |
| 0447967 | 3/1991 | European Pat. Off. . |
| 9500742 | 1/1995 | WIPO . |

OTHER PUBLICATIONS

R. D. Sydansk, "Acrylamide–Polymer/Chromium(III)–Carboxylate Gels for Near Wellbore Matrix Treatments", SPE/DOE 20214 (1990).

Krumrine et al., "Surfactant, Polymer, and Alkali Interactions in Chemical Flooding Processes", SPE 11778 (1983).

Sydansk, R. D., "A New Conformance–Improvement––Treatment Chromium(III) Gel Technology", SPE/DOE 17329 (1988).

Moradi–Araghi et al., "Thermally Stable Gels for Near-–Wellbore Permeability Contrast Corrections", SPE 18500 (1989).

*Primary Examiner*—George A. Suchfield
*Attorney, Agent, or Firm*—Gregory F. Wirzbicki; Shlomo R. Frieman

[57] ABSTRACT

Cationic polymer-containing gels are stable at elevated temperatures in soft and hard waters.

21 Claims, No Drawings

ULTRA-HIGH TEMPERATURE STABLE GELS

CROSS-REFERENCES TO RELATED APPLICATIONS

This application is a continuation of application Ser. No. 08/346,679, filed Nov. 30, 1994, which is a continuation-in-part of application Ser. No. 08/119,715, filed Sep. 10, 1993, now U.S. Pat. No. 5,486,312, which is a division of application Ser. No. 07/940,301, filed Aug. 31, 1992, now U.S. Pat. No. 5,246,073, which applications and patents are incorporated in their entireties by reference.

BACKGROUND

The present invention relates to (a) gels that are stable at high temperatures, (b) compositions for forming the gels, and (c) subterranean formations containing the gels.

More and more wells are being drilled into subterranean formations which are at temperatures greater than about 79.4° C. (175° F.). In fact, subterranean formations at temperatures of about 148.9° C. (300° F.) and above are becoming increasingly more common. This trend is due to (a) the increasing depth to which wells are drilled to penetrate oil- and gas-bearing subterranean formations and (b) the drilling of wells in regions having shallow, high temperature oil- and/or gas-bearing or geothermal subterranean formations, e.g., the North Sea and the Pacific Rim.

Since, few, if any, present gels are stable at about 148.9° C. (300° F.), there is a need for gels that are stable at such temperature.

SUMMARY OF THE INVENTION

The present invention satisfies this need by providing gels that are stable at temperatures of about 148.9° C. (300° F.). The gels are formed by reacting (a) a crosslinking agent and (b) a polymer comprising an (i) acrylamide unit having the formula I

and (ii) a cationic unit having the formula II

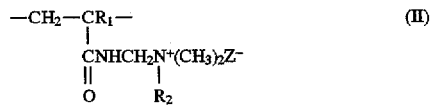

where Z is an anion, $R_1$ and $R_2$ are independently selected from the group consisting of hydrogen and alkyl groups containing 1 to 10 carbon atoms, the mole fraction of acrylamide units present in the polymer is less than 0.5, and the mole fraction of cationic units present in the polymer is at least 0.5, provided that the total sum of these mole fractions is 1. The polymer (which can be random, block, or alternating) is water soluble at the concentration at which it is used.

In one version, the gel is formed in a subterranean formation by (a) injecting a composition comprising (i) the polymer and (ii) water into at least a portion of the subterranean formation; and (b) injecting the crosslinking agent into at least a portion of the subterranean formation. Another technique for forming the gel in situ in a subterranean formation entails the step of injecting a composition comprising (i) the polymer, (ii) the crosslinking agent, and (iii) water into at least a portion of the subterranean formation.

The present invention also provides a recovery system and a gel-forming composition. The recovery system comprises (i) a subterranean formation, (ii) a well penetrating at least a portion of the subterranean formation, and (iii) a gel formed by either of the methods described in the preceding paragraph present in at least a portion of the subterranean formation.

Concerning the gel-forming composition, the composition comprises (i) the polymer, (ii) the crosslinking agent, and (iii) water.

DETAILED DESCRIPTION OF THE INVENTION

As noted above, the polymer employed in the present invention comprises an (i) acrylamide unit having the formula I

and (ii) a cationic unit having the formula II

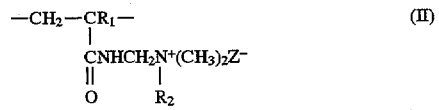

where Z is an anion (e.g., a halide (such as chloride, bromide, or iodide), hydroxyl, carbonate, phosphate, nitrate, etc.), $R_1$ and $R_2$ are independently selected from the group consisting of hydrogen and $C_1$ to $C_{10}$ alkyl groups, the mole fraction of acrylamide units present in the polymer is less than 0.5, and the mole fraction of cationic units present in the polymer is at least 0.5, provided that the total sum of these mole fractions is 1. More typically, the mole fraction of acrylamide units present in the polymer is about 0.4 or less, preferably about 0.3 or less, more preferably about 0.2 or less, and even more preferably about 0.1 or less, and most preferably 0. Accordingly, the mole fraction of cationic units present in the polymer is more commonly about 0.6 or more, preferably about 0.7 or more, more preferably about 0.8 or more, even more preferably about 0.9 or more, and most preferably about 1. Preferably, the number of carbon atoms in the alkyl group is 1 to about 5, more preferably 1 to about 3, even more preferably 1 to about 2, and most preferably 1.

The weight average molecular weight of the polymer is generally at least about 250,000, more often at least about 500,000, even more often at least about 750,000, and most often at least about 1,000,000. Preferably, the weight average molecular weight of the polymer is about 2,000,000 or more, more preferably about 3,000,000 or more, even more preferably about 4,000,000 or more, and most preferably about 5,000,000 or more.

A crosslinked polymer is generally formed by reacting or contacting, in an aqueous medium, proper proportions of the polymer with a crosslinking agent. However, the gel-forming composition need only contain either the polymer or the crosslinking agent. When the polymer or crosslinking agent is omitted from the composition, the omitted material is usually introduced into the subterranean formation as a separate slug, either before, after, or simultaneously with the introduction of the gel-forming composition. Preferably, the composition comprises at least the polymer, and more preferably, both (a) the crosslinking agent and (b) the polymer.

The polymer can be available in several forms such as a water solution or broth, a gel log solution, a dried powder, and a hydrocarbon emulsion or dispersion. As is well known to those skilled in the art, different types of equipment are employed to handle these different forms of the polymer. Gels prepared with the hydrocarbon emulsion or dispersion forms of the polymer generally exhibit longer delays before the onset of gelation than gels made using the other polymer forms noted above.

With respect to crosslinking agents, these agents are organic and inorganic compounds well known to those skilled in the art. Exemplary organic crosslinking agents include, but are not limited to, aldehydes, dialdehydes, phenols, substituted phenols, and ethers. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloroacetate, hydroxyphenylalkanols, formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether are some of the more typical organic crosslinking agents.

Typical inorganic crosslinking agents are polyvalent metals, chelated polyvalent metals, and compounds capable of yielding polyvalent metals. Some of the more common inorganic crosslinking agents include chromium salts, aluminates, gallates, titanium chelates, aluminum citrate, chromium citrate, chromium acetate, chromium propionate, and zirconium chelates or complexes.

As the cationic nature of the polymer increases, the preference for a crosslinking agent selected from the group consisting of aldehydes, hexamethylenetetramine (HMT), and mixtures thereof increases. In addition, for high temperature applications (e.g., for use in subterranean formations having temperatures of about 79.4° C. (175° F.) or more), it is preferred to use a combination of HMT and a phenol (especially, hydroquinone). Furthermore, HMT is also a preferred crosslinking agent because, unlike formaldehyde, it is not known to be carcinogenic.

Optionally, one or more crosslinking rate retardants, stabilizing agents (e.g., buffering agents, chelating agents, and free radical scavengers), and/or surfactants are employed in the present invention. The crosslinking rate retardant should be at least partially soluble in water. Preferably, the crosslinking rate retardant has a solubility in distilled water at about 25° C. of at least about 5, more preferably at least about 10, even more preferably at least about 15, and most preferably at least about 20, ppm. Exemplary crosslinking rate retardants are set forth in the following Table I:

TABLE I

| Crosslinking Rate Retardants | |
|---|---|
| Genus | Species |
| Ethers | Ethyl tert-amyl ether, sec-butyl methyl ether, tert-butyl methyl ether, methyl tert-amyl ether, diethyl ether, 2-bromo-diethyl ether, 2-chloro-diethyl ether, 2,2'-dibenzoyloxy diethyl ether, diisopropyl ether, dimethyl ether, dioctyl ether, o-diphenol ether, p-diphenol ether, 2,4-dinitro-diphenyl ether, dipropyl ether, ethyl vinyl ether, ethenyl ethyl ether, 1,2-dichloro-ethenyl ethyl ether, isobutyl vinyl ether, isopropyl vinyl ether, ethenyl methyl ether, ethyl isopropyl ether, ethyl methyl ether, 2-chloro-ethyl methyl ether, |

TABLE I-continued

| Crosslinking Rate Retardants | |
|---|---|
| Genus | Species |
| | ethyl pentyl ether, ethyl propyl ether, isobutyl propyl ether, isopropyl methyl ether, isopropyl propyl ether, methyl propyl ether, epimethylin, polyalkylene oxides (e.g., polyethylene oxides, polypropylene oxides, polybutylene oxides, polypentylene oxides) |
| Epoxides | 1,2-epoxy ethane, 1,2-epoxy propane, butadiene oxide, 1,2-epoxy-2,4,4-trimethyl pentane |

With respect to stabilizing agents, the stabilizing agents are capable of preventing the degradation of the gel at elevated temperatures (e.g., above about 79.4° C. (175° F.)). The stabilizing agent is preferably capable of preventing gel degradation at subterranean temperatures of at least about 93.3° C. (200° F.), more preferably at least about 107.2° C. (225° F.), and even more preferably at least about 121.1° C. (250° F.), and most preferably at least about 148.9° C. (300° F.). In fact, the stabilizing agent is also capable of preventing gel degradation at higher subterranean temperatures, such as at least about 162.8° C. (325° F.) or about 176.7° C. (350° F.) or even higher temperatures.

Regarding buffering agents, the buffering agents generally have a buffering capacity at a pH of at least about 8. Preferably, the buffering agents have a buffering capacity at a pH of about 8 to about 9, more preferably at a pH of about 8.1 to about 8.9, even more preferably at a pH of about 8.2 to about 8.8, and most preferably at a pH of about 8.3 to about 8.7. Some buffering agents employed in the invention have buffering capacities at pH's of at least about 10 or about 11 or more.

Typical buffering agents include, but are not limited to water-soluble bicarbonate salts, carbonate salts, phosphate salts, and mixtures thereof. Preferably, the buffering agent is selected from the group consisting of the ammonium and alkali metal salts of bicarbonate, carbonate, dibasic phosphate, tribasic phosphate, and mixtures thereof. More preferably, the buffering agent is selected from the group consisting of the ammonium and alkali metal salts of bicarbonate and carbonate, with the ammonium, sodium, and potassium salts of bicarbonate and carbonate being the most preferred buffering agents.

Concerning the chelating agents, exemplary types of chelating agents include, but are not limited to, polyphosphates (e.g., sodium tripolyphosphate, hexametaphosphoric acid), aminocarboxylic acids (e.g., ethylenediaminetetraacetic acid (EDTA), N-(hydroxyethyl) ethylenediaminetetraacetic acid (HEDTA), nitrilotriacetic acid (NTA), diethylenetriaminepentaacetic acid (DTPA), N-dihydroxyethylglycine, ethylenebis (hydroxyphenylglycine), 1,3-diketones (e.g., acetylacetone, trifluoroacetylacetone, thenoyltrifluoroacetone), hydroxycarboxylic acids (e.g., tartaric acid, citric acid, gluconic acid, 5-sulfosalicylic acid), polyamines (e.g., ethylenediamine, triethylenetetramine, triaminotriethylamine), aminoalcohols (e.g., triethanolamine, N-hydroxyethylethylenediamine), aromatic heterocyclic bases (e.g., dipyridyl, o-phenanthroline), phenols (e.g., salicylaldehyde, disulfopyrocatechol, chromotropic acid), aminophenols (e.g., oxine, 8-hydroxyquinoline, oxinesulfonic acid), oximes (e.g., dimethylglyoxime, salicylaldoxime), Shiff bases (e.g., disalicylaldehyde 1,2-propylenediimine), tetrapyrroles (e.g., tetraphenylporphin, phthalocyanine), sulfur compounds (e.g., toluenedithiol, dimercaptopropanol, thioglycolic acid, potassium ethyl xanthate, sodium diethyldithiocarbamate, dithizone, diethyl dithiophosphoric acid, thiourea), polymeric (e.g., polyethylenimine, polymethacryloylacetone, poly(p-vinylbenzyliminodiacetic acid), and phosphonic acids (e.g., nitrilomethylenephosphonic acid, ethylenediaminetetra(methylenephosphonic acid), hydroxyethylidenediphosphonic acid).

With respect to free radical scavengers, the free radical scavengers are especially desirable for use in gelable compositions intended to be injected into subterranean formation having a temperature greater than about 43.3° C. (110° F.). Representative free radical scavengers include, but are not limited to, phenols (e.g., hydroquinone and catechol), aromatic amines (e.g., aniline and para-aminophenols), and oxygen scavengers (e.g., sulfites (such as sodium sulfite, ammonium sulfite, sodium bisulfite, and ammonium bisulfite), thio-containing compounds (e.g., thiosulfate and thiourea), sulfides (such as hydrogen sulfide and sodium sulfide), sodium dithionite, and low molecular weight alcohols (e.g., the primary alcohols methanol, ethanol, isopropanol, isobutanol, and n-butanol)). Other free radical scavengers are well known to those skilled in the art. See, for example, SPE 9296, which is incorporated herein in its entirety by reference.

Regarding the optional surfactants, the preferred surfactants are water-soluble and have sufficient foaming ability to enable the composition, when traversed by a gas, to foam and, upon curing, form a foamed gel. More specifically, the preferred surfactants are those which, when incorporated into water in a concentration of about 5 weight percent or less (based on the total weight of water and surfactant), generally meet the following described test. The surfactant is dissolved in water and about 500 ml of the resulting solution is placed in a graduated cylinder to form a column having a height of about 50 cm. Natural gas is passed into the bottom of the column through a fritted glass disc at substantially atmospheric pressure so that the gas bubbles through the column of liquid and passes out the top of the cylinder. The gas rate is maintained at about 500 ml gas per minute per square inch of column cross-sectional area, and the flow of the gas is continued for a period of about 15 minutes. Under these conditions, the preferred surfactants produce a column of foam at least about 180 cm in height above the top of the column of liquid.

Exemplary surfactants include, but are not limited to, alkyl polyethylene oxide sulfates (e.g., ALIPAL CD 128 brand surfactant), alkyl alkylolamine sulfates, modified ether alcohol sulfate sodium salt, sodium lauryl sulfate, perfluoroalkanoic acids and salts having about 3 to about 24 carbon atoms per molecule (e.g., perfluorooctanoic acid, perfluoropropanoic acid, and perfluorononanoic acid), modified fatty alkylolamides, polyoxyethylene alkyl aryl ethers, octylphenoxyethanol, ethanolated alkyl guanidine-amine complexes, condensation of hydrogenated tallow amide and ethylene oxide, ethylene cyclomido 1-lauryl, 2-hydroxy, ethylene sodium alcoholate, methylene sodium carboxylate, alkyl arylsulfonates, sodium alkyl naphthalene sulfonate, sodium hydrocarbon sulfonates, petroleum sulfonates, sodium linear alkyl aryl sulfonates, alpha olefin sulfonates, condensation product of propylene oxide with ethylene oxide, sodium salt of sulfated fatty alcohols, octylphenoxy polyethoxy ethanol, sorbitan monolaurate, sorbitan monopalmitate, sorbitan trioleate, polyoxyethylene sorbitan tristearate, polyoxyethylene sorbitan tristearate, polyoxyethylene sorbitan monooleate, dioctyl sodium sulfosuccinate, modified phthalic glycerol alkyl resin, octylphenoxy polyethoxy ethanol, acetylphenoxy polyethoxy ethanol, dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$ to $C_6$ sulfodicarboxylic acids having the general formula III

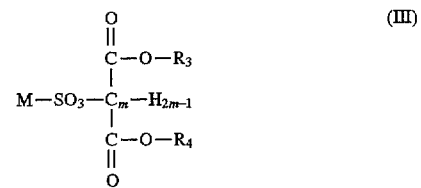

where M is selected from the group consisting of alkali metals, ammonium, and substituted ammonium; $R_3$ and $R_4$ are each independently an alkyl group containing about 3 to about 16 carbon atoms, and m is an integer from 1 to about 4.

Either hard or soft water is employed in preparing the gel-forming composition of the present invention. (As used in the specification and claims, the term "hard water" means an aqueous liquid having a total divalent cation content of at least 80 parts per million by weight (ppmw); and the term "soft water" means an aqueous liquid having a total divalent cation content of less than 80 ppmw.) The total divalent cation content of the hard water employed in the present invention is generally at least about 100 ppmw. Hard water having an even higher total divalent cation concentration (e.g., about 250, 500, 1,000, 5,000, 10,000, 15,000, 20,000 or more, ppmw) may also be employed in the invention. Exemplary types of hard waters include, but are not limited to, sea water (typically having a total divalent cation concentration of about 1,000 to about 1,500 ppmw), water produced from oil and gas fields (usually having a total divalent cation concentration of about 100 to about 20,000 ppmw), and geothermal brines (often having a total divalent cation concentration of about 100 to about 30,000 ppmw). Calcium, magnesium, strontium, and barium are the divalent cations commonly prevalent in hard water, with calcium and magnesium being typically the most prevalent.

In the soft water embodiment of the invention, the soft water commonly has a total divalent cation concentration less than about 50 ppmw or even lower (e.g., less than about 25 ppmw).

In general, the gel-forming compositions of the present invention are formed by mixing, in the hard or soft water, the polymer, the crosslinking agent, and, optionally, the crosslinking rate retardant, the stabilizing agent, and/or the surfactant. As known to those skilled in the art, the exact polymer and crosslinking agent concentrations are selected to assure (a) gel stability at reservoir (i.e., subterranean) conditions and (b) a suitable time frame for injecting the composition prior to gelation. The polymer is generally employed in a concentration of about 0.05 to about 50 weight percent, with polymer concentrations of about 0.1 to about 10 weight percent being preferred, about 0.2 to about 5 weight percent being more preferred, and about 0.25 to about 2.5 weight percent being most preferred. (Unless otherwise indicated, as used in the specification and claims, the term "weight percent" means the weight of a particular ingredient (e.g., polymer, crosslinking agent, crosslinking rate retardant, stabilizing agent, or surfactant) divided by the total weight of all ingredients present in the gel-forming composition.) Generally, polymers having a high molecular weight (e.g., above about 10,000,000 weight average molecular weight) are frequently employed towards the lower portion of the concentration ranges, while low molecular weight polymers are often used in amounts approaching the upper end of the concentration ranges.

Typically, the crosslinking agent is employed in a concentration of at least about 0.001, and usually less than about 5, weight percent. Preferably, the concentration of the crosslinking agent in the gel-forming composition is about 0.0025 to about 3, more preferably about 0.005 to about 2, even more preferably about 0.0075 to about 1.5, and most preferably about 0.01 to about 1, weight percent. When more than one class of crosslinking agents are used in the present invention (e.g., when HMT and a phenol are employed together), each class of crosslinking agents is employed in the ranges set forth in this paragraph.

Concerning the crosslinking rate retardant, the crosslinking rate retardant, when employed, is used in an amount sufficient to delay the onset of gelation until the entire volume of the gelable composition has been displaced into the subterranean formation. Generally, the crosslinking rate retardant is employed in the composition in a concentration of at least about 0.001, preferably at least about 0.0025, more preferably at least about 0.005, and most preferably at least about 0.0075, weight percent. In most cases, the crosslinking rate retardant is used in a concentration less than about 1, preferably less than about 0.5, more preferably less than about 0.1, and most preferably less than about 0.075, weight percent. In addition, the ratio of the crosslinking rate retardant to the crosslinking agent employed in the gel-forming composition is frequently from about 0.001:1 to about 25:1, the ratio being based on either the respective weights or weight percents of the crosslinking rate retardant and the crosslinking agent. Preferably, the ratio is about 0.005:1 to about 10:1, more preferably about 0.01:1 to about 5:1, and most preferably about 0.02:1 to about 4:1.

With respect to the stabilizing agent, when present, the stabilizing agent is generally employed in a sufficient concentration to increase the stability of the gel (in comparison to a gel containing identical ingredients but devoid of the stabilizing agent) at the temperature of the subterranean formation by at least about one day, preferably by at least about one week, more preferably by at least about one month, and most preferably by at least about one year.

When the stabilizing agent is the buffering agent, the buffering agent is usually present in the gel-forming compositions in a concentration of at least about 0.5, preferably at least about 0.75, more preferably at least about 1, and most preferably at least about 1.5, weight percent. Generally, the buffering agent is present in the gel-forming composition in a concentration of less than about 20, preferably less than about 10, more preferably less than about 5, and most preferably less than about 2.5, weight percent.

In those instances when the stabilizing agent is a chelating agent, the chelating agent is generally employed in the composition in a concentration of at least about 0.75 mole per mole of dissolved divalent cations present in the hard water employed in making the composition. When a soft water is used in making the gel-forming composition, the chelating agent is usually employed in the gel-forming composition in a concentration of at least about 0.75 mole per mole of dissolved divalent cations present in the hard water located in the subterranean formation where the gel will be formed. Preferably, the ratio of the moles of the chelating agent employed in the gel-forming composition to the moles of the dissolved divalent cation is about 0.75:1 to about 10:1, more preferably about 0.8:1 to about 5:1, and most preferably about 0.9:1 to about 2.5:1. While a ratio of about 10 moles chelating agent per mole dissolved divalent cation can be employed in the invention, there does not appear to be any significant advantage to employing a ratio greater than about 2:1.

When the chelating agent is used, the pH of the water employed to formulate the gel-forming compositions is preferably at least about 6.5, more preferably at least about 7, even more preferably at least about 7.5, and most preferably at least about 8. Since most waters employed in preparing gel-forming compositions have a pH of at least about 6.5, there is generally no need to modify the pH of such water. Nevertheless, in those instances where it is desirable or necessary to raise the pH of the water, any organic or inorganic base can be employed. In addition, one or more chelating agents can be used in conjunction with one or more of the above-described buffering agents.

In some cases (e.g., when the chelating agent is an aldehyde), the chelating agent is capable of also functioning as a crosslinking agent. In such instances, the crosslinking agent is preferably present in the above-described crosslinking agent concentration ranges and the dual acting chelating agent is preferably present in the above-noted chelating agent concentration ranges.

When used, the free radical scavenger is normally present in a concentration of about 0.001 to about 0.1, preferably about 0.01 to about 0.075, and more preferably about 0.02 to about 0.05, weight percent. In those instances where the chelating agent is also capable of functioning as a free radical scavenger (e.g., when certain phenolic compounds are the chelating agent) no separate free radical scavenger need be employed in the gel-forming composition of the present invention, provided the dual-acting chelating agent is employed within the above noted chelating agent concentration ranges.

The above-described buffering, chelating agents, and free radical scavengers are optionally employed in combination, with each agent generally being used within its aforementioned respective range.

The surfactant, when employed, is typically used in a concentration up to about 10, preferably about 0.01 to about 5, more preferably about 0.05 to about 3, and most preferably about 0.1 to about 2 weight percent.

When separate slugs of the polymer, the crosslinking agent, the crosslinking rate retardant, the stabilizing agent, and/or the surfactant are injected into the subterranean formation, the amount of each of these injected ingredients is generally sufficient for their respective concentrations in the combined weight of the injected slugs (including the weight of any intervening spacer slugs) to fall within the above-stated concentration ranges.

The separate slugs are injectable in any order. For example, the crosslinking agent-containing slug can be injected after the injection of slugs containing the other ingredients constituting the gel-forming composition. In addition, each slug is injectable as a single unit or injectable as a plurality of mini-units having substantially the same make-up.

Furthermore, it is preferred to inject a preflush fluid prior to injecting the slug or slugs that constitute the gel-forming composition. The volume of preflush fluid injected is generally about 5 to about 10 volume percent of the total volume of injected material constituting the gel-forming composition. The preflush fluid typically comprises a crosslinking agent and water, the concentration of the crosslinking agent in the preflush fluid ranging roughly from about 100 to about 200 percent of the concentration of the crosslinking agent in the gel-forming composition. Optionally, the preflush fluid also contains a crosslinking rate retardant and/or a stabilizing agent. When employed, the concentrations of the crosslinking rate retardant and the stabilizing agent in the preflush fluid are approximately the same as their respective concentrations in the gel-forming composition. (The preflush fluid is not considered part of the gel-forming composition and is, therefore, not included in calculating the volume of material which constitutes the gel-forming composition. Similarly, the amount of each ingredient (e.g., crosslinking agent, crosslinking rate retardant, and stabilizing agent) present in the preflush fluid is not included in calculating the concentration of the respective ingredient in the gel-forming composition.)

When a surfactant is employed in the process of the present invention, one or more slugs of a gas are also injected into the subterranean formation. While the gas slugs are injectable before, during, or after the injection of the gel-forming composition or separate slugs constituting the gel-forming composition, it is preferred to inject at least some, and more preferentially all, of the gas slugs after or simultaneously during the injection of the composition. Also preferred is the alternate, sequential injection of one or more slugs of the gel-forming composition and one or more slugs of the gas. The gas slugs are injected into the composition during the gelation period and before the composition has formed a gel incapable of being penetrated by the gas at normal gas injection pressures. Normal gas injection pressures are injection pressures less than the formation fracturing pressure. The gas slugs foam the surfactant-containing composition so that a foamed gel is produced.

The amount of gas injected (when measured at the temperature and pressure conditions in the subterranean formation being treated) is generally about 1 to about 99 volume percent based upon the total volume of treatment fluids injected into the subterranean formation (i.e., the sum of the volume of injected gas plus the volume of injected foamable, gel-forming composition). Preferably, the amount of gas injected is about 20 to about 98, and more preferably about 40 to about 95, volume percent based upon the total volume of injected treatment fluids.

The injected gas is usually a noncondensable gas. Exemplary noncondensable gases include air, hydrogen, noble gases (helium, neon, argon, krypton, xenon, and radon), natural gas, hydrocarbon gases (e.g., methane, ethane), nitrogen, and carbon dioxide. Natural gas, nitrogen, and carbon dioxide are the more preferred noncondensable gases, with nitrogen being the most preferred.

One exemplary process for practicing the present invention is as follows. Before mixing any chemicals into the water employed in making the gel-forming composition, the water is generally filtered to prevent any suspended solids from damaging the formation by plugging the wellbore. Typically, the first chemicals added to the water are any required salts such as potassium or ammonium chloride and the buffering agent (e.g., potassium, sodium, or ammonium bicarbonate) and/or the chelating agent (e.g., EDTA). The potassium and/or ammonium chloride are generally employed to prevent clay problems in the formation. While potassium and ammonium chloride also help stabilize the gel at low temperatures (e.g., at a temperature less than about 65.6° C. (150° F.)), they are ineffective for stabilizing gels at temperatures above about 79.4° C. (175° F.).

In order for the polymer to experience a high degree of turbulence during the initial mixing stage, solid polymers and liquid-based polymers are usually added to the water through an eductor and a positive displacement pump, respectively. The polymer and water are typically mixed in a mixing tank in small 1.6 to 4 cubic meter (10 to 25 barrel) batches. When desired, further mixing is achieved using either centrifugal pumps or other forms of agitation.

When the crosslinking rate retardant is a polymer (e.g., a polyalkylene oxide), it is generally added to the mixing tank together with the crosslinkable polymer. However, when the crosslinking rate retardant is a not a polymer, it is usually added to the mixing tank before the addition of the polymer.

Frequently, the last chemicals to be added to the mixing tank are the crosslinking agent (e.g., the aldehydes, HMT, and mixtures thereof) and the free radical scavenger. When used in a solid form, the crosslinking agent and the free radical scavenger are commonly first dissolved in water in order for them to more readily mix with the contents of the mixing tank. This is especially important when the contents of the mixing tank are very viscous. After the free radical scavenger is added, the resulting composition should be injected promptly into the subterranean formation or stored in a substantially air-free environment until it is injected.

The gel-forming composition is obtained when all the desired ingredients have been mixed in the mixing tank. The resulting gel-forming composition is then often injected into the subterranean formation through a production or injection well at a pressure below the fracture pressure of the formation. Depending on the injection capabilities of the well, the first slug of the gel-forming composition generally varies from about 8 to about 80 cubic meters (50 to 500 barrels).

The manner in which a non-foaming gel-forming composition is injected into a production well typically depends on whether the production well penetrates a gas-producing formation or an oil-producing formation. In the case of an oil production well, a single slug of the non-foaming gel-forming composition is generally injected. In contrast, alternate slugs of the non-foaming gel-forming composition are usually injected into a gas production well, with the alternating slug commonly being a noncondensable gas. (In the case of injection wells, alternate slug injections of the non-foaming gel-forming composition are generally not employed.)

When a foamed gel is desired, the surfactant is preferably added to the gel-forming composition "on the fly," i.e., as the composition is being injected into the subterranean formation. (Introducing the surfactant into the composition "on the fly" avoids foaming the composition in the mixing tank.) Next, the injection of the foamable gel-forming composition is stopped, and a noncondensable gas such as nitrogen is injected into the production well to foam the gel-forming composition. The volume of the nitrogen slug (based upon the temperature and pressure conditions within the formation being treated) is typically about 100 to about 1,000 percent of the volume of the previously injected slug of foamable gel-forming composition volume. The alternating slugs of foamable gel-forming composition and nitrogen are then repeated to achieve the desired penetration depth into the formation as well as the desired degree of foam quality. (The resulting foamed gel usually has a foam quality of at least about 50 volume percent, preferably about 70 to about 99 volume percent, more preferably about 80 to about 99 volume percent, and most preferably about 90 to about 98 volume percent. As used in the specification and claims, the foam quality is the volume of gas bubbles present in the foamed gel divided by the entire volume of the foamed gel.) The volume of the final nitrogen slug is preferably large enough to over-displace the wellbore of any foamable, gel-forming composition.

The agent employed to displace the injected composition into the subterranean formation depends on the type of well being treated and/or whether a foaming or non-foaming gel-forming composition is used. When an oil production well is being treated with a non-foaming gel-forming composition, the composition is usually displaced with an oil (e.g., crude oil, mineral oil, diesel oil, as well as oil produced from the subterranean formation being treated). In those instances where a gas production well is being treated or where a foaming gel-forming composition is being injected into a production well, the composition is typically displaced into the formation with a noncondensable gas. In the case of injection wells, the normal injection well fluid is generally used to displace the gel-forming composition from the wellbore and into the formation.

The gel-forming composition is displaced into the formation a sufficient distance so that at least a portion of the pore space in the formation is occupied by the composition, with the actual distance depending on whether a production or an injection well is being treated. In the case of a production well, the injected composition occupies at least a portion of the pores located typically at least about 0.3 meter (1 foot), preferably at least about 1 meter (3 feet), more preferably at least about 3 meters (10 feet), even more preferably at least about 6.1 meters (20 feet), and most preferably at least about 9.1 meters (30 feet) from the production well. Regarding an injection well, the injected composition occupies at least a portion of the pores located generally at least about 4.6 meters (15 feet), preferably at least about 9.1 meters (30 feet), more preferably at least about 15.2 meters (50 feet), even more preferably at least about 22.9 meters (75 feet), and most preferably at least about 30.5 meters (100 feet) from the injection well.

The well is then shut in for a sufficient period of time to allow the gel-forming composition within the pores of the subterranean formation to gel. Following the shut in period, the well is slowly put back into service in order not to displace or damage the resulting gel.

EXAMPLES

The following examples, which are intended to illustrate and not limit the invention, demonstrate the preparation of exemplary cationic polymer-containing compositions and gels within the scope of invention as well as the stability of such gels when aged at preselected temperatures. (See Examples 1–17.) In addition, Comparative Example 18 demonstrates the instability of a nonionic polymer-containing gel at an elevated temperature.

EXAMPLES 1–16

Aqueous polymer stock solutions comprising C-500 brand 100% cationic polymer (obtained from Dai-Ichi Kogyo Seiyaku Co., Ltd. of Japan) were prepared using the following protocol.

Polymer Stock Solution

Sodium bicarbonate (about 6 g) and C-500 brand 100% cationic polymer (about 3 g) were added to seawater (about 291 g). The resulting mixture was stirred at about 200 rpm until the polymer became fully hydrated.

Hydroquinone Stock Solution

Hydroquinone was mixed with distilled water to form a 10 weight percent hydroquinone stock solution.

Hexamethylenetetramine Stock Solution

Hexamethylenetetramine was mixed with distilled water to form a 10 weight percent hexamethylenetetramine stock solution.

Test Sample

For each sample, the polymer stock solution (about 10 g) was added to a vial or tube. Next, the correct volumes of the hydroquinone and hexamethylenetetramine stock solutions were added to the vial or tube using a micropipet. When the vial was used, it was sealed by screwing down its threaded teflon cap, and, when the tube was used, it was purged with nitrogen several times and flame sealed under a partial vacuum. The sealed vial or tube was then shaken. When used, the sealed tube was next inserted into a stainless steel containment vessel containing some distilled water and, prior to aging, the containment vessel was capped.

Test Procedure

Each sample was aged in an oven at the temperatures specified below in Tables B–D and rated using the gel rating key set forth in the following Table A. The results of the aging tests are set forth below in Tables B–D.

TABLE A

| Gel Rating Key | |
|---|---|
| 5 | Rigid Gel |
| 4 | Elastic Gel |
| 3 | Weak Gel |
| 2 | Viscous Fluid |
| 1 | Water-like Fluid |
| n% | % Syneresed (Separated) Water |
| T | Trace of Water |

TABLE B

Gels Prepared In Seawater Containing 2 wt % Sodium Bicarbonate, Aged At 176.7° C. (350° F.), And Employing 1 wt % C-500 Brand Cationic Polymer

| | ppmw | | Hours | | | Gel Ratings Days | | | | | | | | |
|---|---|---|---|---|---|---|---|---|---|---|---|---|---|---|
| Ex | HQ[1] | HMT[2] | 1 | 2 | 3 | 1 | 2 | 5 | 6 | 7 | 14 | 21 | 60 | Receptacle |
| 1 | 200 | 5000 | 1+ | 1+ | 1+ | 2− | 2− | NT[3] | NT | NT | NT | NT | 1+ | Vial |
| 2 | 500 | 5000 | 1+ | 1+ | 1+ | 3 | 4 | 4− | 4− | 3 | 4/10% | 2− | 1+ | Vial |
| 3 | 2000 | 5000 | 4+ | 4+ | 4+ | 4++ | 4++ | 5− | 5 | 5 | 5/15% | 5/90% | 5/95% | Vial |
| 4 | 200 | 5000 | NT | NT | NT | NT | NT | NT | NT | NT | 3 | 3 | 2 | Tube |
| 5 | 500 | 5000 | NT | NT | NT | NT | NT | NT | NT | NT | 4+ | 4+ | Broke | Tube |
| 6 | 2000 | 5000 | NT | NT | NT | NT | NT | NT | NT | 5+ | 5+ | 5 | 5+ | Tube |

[1]HQ denotes hydroquinone.
[2]HMT denotes hexamethylenetetramine.
[3]NT denotes not taken.

TABLE C

Gels Prepared In Seawater Containing 2 wt % Sodium Bicarbonate, Aged At 176.7° C. (350° F.), And Employing C-500 Brand Cationic Polymer

| | ppmw | | | Gel Ratings | | | | | | | |
|---|---|---|---|---|---|---|---|---|---|---|---|
| | | | | Hours | | Days | | Weeks | | | |
| Ex | CT[1] | HQ[2] | HMT[3] | 1 | 5 | 1 | 5 | 1 | 5 | 10 | 12 | Receptacle |
| 7 | 7500 | 1000 | 1000 | 5+ | 5/5% | 5/5% | 4/5% | 4+ | 4/5% | 4/30% | 1+ | Vial |
| 8 | 7500 | 5000 | 5000 | 5/T | 5+/T | 5+/T | 5−/T | 5− | 5/15% | 5/20% | 5/20% | Vial |
| 9 | 10,000 | 500 | 500 | 5 | 5/T | 5/T | 5−/T | 5−/T | 4+ | 4 | 4 | Vial |
| 10 | 10,000 | 2000 | 1000 | 5++ | 5+/T | 5+/T | 5+/T | 5+/T | 5++/5% | 5+/5% | 5+/5% | Vial |

[1]CT denotes C-500 brand cationic polymer.
[2]HQ denotes hydroquinone.
[3]HMT denotes hexamethylenetetramine.

TABLE D

Gels Prepared In Seawater Containing 4 wt % Bicarbonate, Aged At 204.4° C. (400° F.), And Employing 1 wt % C-500 Brand Cationic Polymer

| | ppmw | | Gel Ratings | | | | | | | |
|---|---|---|---|---|---|---|---|---|---|---|
| | | | Hours | | Days | | | | | |
| Ex | HQ[1] | HMT[2] | 2 | 5 | 1 | 2 | 3 | 7 | 21 | Receptacle |
| 11N[3] | 2000 | 1000 | 5+/T | 5−/T | 5++/T | 5++/T | 5+/10% | 5+/20% | Broke | Vial |
| 12K[4] | 2000 | 1000 | 5+/T | 5−/5% | 5+/T | 5+/T | 5 | 5/20% | 5/80% | Vial |
| 13N | 2000 | 2000 | 5+/5% | 4+/5% | 5+/T | 5+/T | 5+/5% | 5+/10% | 5/10% | Vial |
| 14K | 2000 | 2000 | 5+/T | 4+ | 4 | 3− | 2 | 1+ | 1+ | Vial |
| 15K | 5000 | 1000 | 5+/T | 5+/T | 5+/T | 5+/T | 5+/T | 5+/T | 4+/25% | Vial |
| 16K | 5000 | 2000 | 5+/T | 5+/5% | 5+/5% | 5+/T | 5+/T | 5+/T | 2+ | Vial |

[1]HQ denotes hydroquinone.
[2]HMT denotes hexamethylenetetramine.
[3]N denotes sodium bicarbonate.
[4]K denotes potassium bicarbonate.

The results listed above in Tables B–D indicate that gels made with a 100 percent cationic polymer are stable at temperatures up to at least about 204.4° C. (400° F.).

EXAMPLE 17

An aqueous polymer stock solution comprising C-500 brand 100% cationic polymer (obtained from Dai-Ichi Kogyo Seiyaku Co., Ltd. of Japan) was prepared using the following protocol.

Polymer Stock Solution

Sodium bicarbonate (about 6 g) and about 6 g of C-500 brand 100% cationic polymer were added to seawater (about 291 g). The resulting mixture was stirred at about 200 rpm until the polymer became fully hydrated.

Hydroquinone Stock Solution

Hydroquinone was mixed with distilled water to form a 10 weight percent hydroquinone stock solution.

Hexamethylenetetramine Stock Solution

Hexamethylenetetramine was mixed with distilled water to form a 10 weight percent hexamethylenetetramine stock solution.

Test Sample

The polymer stock solution (about 10 g) was added to a vial. Next, the correct volumes of the hydroquinone and hexamethylenetetramine stock solutions were added to the vial using a micropipet. The vial was then capped and shaken.

Test Procedure

The sample was aged in an oven at the temperature specified below in Table E and rated using the gel rating key set forth in above Table A. The results of the aging test are set forth below in Table E.

TABLE E

Gels Prepared in Seawater Containing 2% Sodium Bicarbonate, 1 wt % Polymer and Aged at 176.7° C. (350° F.)

| | | | | Gel Ratings | | | | | | | |
|---|---|---|---|---|---|---|---|---|---|---|---|
| | | | | Hours | | Days | | Weeks | | | |
| Ex | Polymer | HQ[1] | HMT[2] | 1 | 5 | 1 | 5 | 1 | 3 | 10 | 12 |
| 17 | C-500[3] | 2000 | 1000 | 5++ | 5+/T | 5+/T | 5+/T | 5+/T | 5++/5% | 5+/5% | 5+/5% |
| 18 | P-700SN[4] | 2000 | 1000 | 5− | 5+/T | 4+ | 4− | 3+ | 2− | 2− | 2− |

[1]HQ refers to hydroquinone concentrations in ppm by weight.
[2]HMT refers to hexamethylenetetramine concentrations in ppm by weight.
[3]C-500 brand 100% cationic polymer.
[4]P-700SN brand nonionic acrylamide polymer.

COMPARATIVE EXAMPLE 18

The procedure of Example 17 was repeated with one modification, namely, the aqueous polymer stock solution was prepared using P-700SN brand nonionic acrylamide polymer (obtained from Dai-Ichi Kogyo Seiyaku Co., Ltd.) instead of C-500 brand 100% cationic polymer. The results of this comparative test are also set forth in Table E, supra.

The comparative data presented in the above Table E show that, at an elevated temperature, a gel formed from a nonionic acrylamide polymer is unstable, while a gel formed from a cationic polymer is stable.

Although the present invention has been described in considerable detail with reference to some preferred versions, other versions are possible. Therefore, the spirit and scope of the appended claims should not necessarily be limited to the description of the preferred versions contained herein.

What is claimed is:

1. A method for forming a gel in at least a portion of a subterranean formation, the method comprising the steps of:
    (A) injecting a composition into at least a portion of a subterranean formation, the composition comprising (i) water and (ii) a water soluble, crosslinkable polymer comprising an (α) acrylamide unit having the formula I

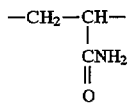

and (β) a cationic unit having the formula II

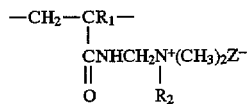

where Z is an anion, $R_1$ and $R_2$ are independently selected from the group consisting of hydrogen and alkyl groups containing 1 to 10 carbon atoms, the mole fraction of acrylamide units present in the polymer is less than 0.5, and the mole fraction of cationic units present in the polymer is at least 0.5, provided that the total sum of these mole fractions is 1; and
    (B) injecting a crosslinking agent into at least a portion of the subterranean formation, the crosslinking agent being selected from the group consisting of gallic acid, dihydroxynaphthalene, terephthaldehyde, hexamethylenetetramine, trioxane, tetraoxane, polyoxymethylene, phenols, substituted phenols, and mixtures thereof.

2. A method for forming a gel in at least a portion of a subterranean formation, the method comprising the step of injecting a composition into at least a portion of a subterranean formation, the composition comprising (A) water, (B) a crosslinking agent selected from the group consisting of gallic acid, dihydroxynaphthalene, terephthaldehyde, hexamethylenetetramine, trioxane, tetraoxane, polyoxymethylene, phenols, substituted phenols, and mixtures thereof, and (C) a water soluble, crosslinkable polymer comprising an (α) acrylamide unit having the formula I

and (β) a cationic unit having the formula II

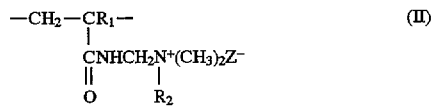

where Z is an anion, $R_1$ and $R_2$ are independently selected from the group consisting of hydrogen and alkyl groups containing 1 to 10 carbon atoms, the mole fraction of acrylamide units present in the polymer is less than 0.5, and the mole fraction of cationic units present in the polymer is at least 0.5, provided that the total sum of these mole fractions is 1.

3. The method of claim 2 further comprising the step of injecting a gas into at least a portion of the subterranean formation, where the composition further comprises one or more ingredients capable of foaming the composition.

4. A recovery system comprising:
    (a) a subterranean formation;
    (b) a well penetrating at least a portion of the subterranean formation; and
    (c) a gel located in at least a portion of the subterranean formation, the gel being formed by the method of claim 1.

5. A recovery system comprising:
    (a) a subterranean formation;
    (b) a well penetrating at least a portion of the subterranean formation; and
    (c) a gel located in at least a portion of the subterranean formation, the gel being formed by the method of claim 2.

6. The method of claim 2 where the mole fraction of the cationic units in the polymer is about 0.6 or more.

7. A recovery system comprising:
(a) a subterranean formation;
(b) a well penetrating at least a portion of the subterranean formation; and
(c) a composition located in at least a portion of the well, where the composition comprises:
(i) a polymer comprising an (α) acrylamide unit having the formula I $$-CH_2-CH- \atop \underset{O}{\overset{\|}{\underset{|}{C}NH_2}}} \quad (I)$$

and (β) a cationic unit having the formula II $$-CH_2-CR_1- \atop \underset{O\ \ R_2}{\overset{\|}{\underset{|}{C}NHCH_2N^+(CH_3)_2Z^-}}} \quad (II)$$

where Z is an anion, $R_1$ and $R_2$ are independently selected from the group consisting of hydrogen and alkyl groups containing 1 to 10 carbon atoms, the mole fraction of acrylamide units present in the polymer is less than 0.5, and the mole fraction of cationic units present in the polymer is at least 0.5, provided that the total sum of these mole fractions is 1;
(ii) a crosslinking agent selected from the group consisting of gallic acid, dihydroxynaphthalene, terephthaldehyde, hexamethylenetetramine, trioxane, tetraoxane, polyoxymethylene, phenols, substituted phenols, and mixtures thereof; and
(iii) water.

8. The method of claim 2 where the crosslinking agent is selected from the group consisting of terephthaldehyde, phenols, substituted phenols, and mixtures thereof.

9. The method of claim 32 where the phenols and substituted phenols are selected from the group consisting of phenol, resorcinol, catechol, phloroglucinol, pyrogallol, hydroquinone, and mixtures thereof.

10. The method of claim 2 where the crosslinking agent is selected from the group consisting of terephthaldehyde, hydroquinone, and mixtures thereof.

11. The method of claim 2 where the crosslinking agent comprises terephthaldehyde.

12. The method of claim 2 where the crosslinking agent is selected from the group consisting of gallic acid, hexamethylenetetramine, and mixtures thereof.

13. The method of claim 2 where the crosslinking agent comprises gallic acid.

14. The method of claim 2 where the crosslinking agent is selected from the group consisting of dihydroxynaphthalene, hexamethylenetetramine, terephthaldehyde, phenols, substituted phenols, and mixtures thereof.

15. The method of claim 2 where the crosslinking agent is selected from the group consisting of dihydroxynaphthalene, hexamethylenetetramine, and mixtures thereof.

16. The method of claim 2 where the crosslinking agent is selected from the group consisting of dihydroxynaphthalene, hydroquinone, and mixtures thereof.

17. The method of claim 2 where the crosslinking agent is selected from the group consisting of dihydroxynaphthalene, terephthaldehyde, and mixtures thereof.

18. The method of claim 2 where the crosslinking agent comprises dihydroxynaphthalene.

19. The method of claim 2 where the crosslinking agent comprises trioxane.

20. The method of claim 2 where the crosslinking agent comprises tetraoxane.

21. The method of claim 2 where the crosslinking agent comprises polyoxymethylene.

* * * * *

UNITED STATES PATENT AND TRADEMARK OFFICE
CERTIFICATE OF CORRECTION

PATENT NO. : 5,762,141
DATED : June 9, 1998
INVENTOR(S) : Richard D. Hutchins, Hoai T. Dovan and Burton B. Sandiford It is certified that error appears in the above-indentified patent and that said Letters Patent is hereby corrected as shown below:

Claim 9, column 17, line 38, replace "32" with -- 8 --.

Signed and Sealed this

Tenth Day of November 1998

*Attest:*

BRUCE LEHMAN

*Attesting Officer*  Commissioner of Patents and Trademarks